No. 645,209. Patented Mar. 13, 1900.
O. MOH.
PHOTOGRAPHIC FILM.
(Application filed Dec. 3, 1898.)

(No Model.)

Witness
P. F. Sonnek.
J. Green

Inventor:
Oswald Moh
By Knight Bros
Attys

United States Patent Office.

OSWALD MOH, OF GÖRLITZ, GERMANY.

PHOTOGRAPHIC FILM.

SPECIFICATION forming part of Letters Patent No. 645,209, dated March 13, 1900.

Application filed December 3, 1898. Serial No. 698,206. (No specimens.)

*To all whom it may concern:*

Be it known that I, OSWALD MOH, a subject of the King of Prussia, German Emperor, residing at Görlitz, in the Kingdom of Prussia, Germany, have invented certain new and useful Improvements in Processes for Making Photographic Films, (for which I have applied for a patent in Germany, dated September 19, 1898,) of which the following is a specification.

This invention relates to the production of flexible films which after exposure, development, fixing, and washing are adapted to be separated from a backing-sheet which supports them during the above operation, the film thus separated being better adapted for printing. The manipulation of such films has heretofore been attended with difficulties, so that they could not be used to advantage without considerable practice either by professional operators or amateurs.

The object of the present invention is to remove the objectionable features hitherto existent in that the films prepared by the new process dry easily and can be drawn off with certainty, and at the same time further improvements are made with a view to retouching as well as reinforcement and protection to the film.

Figure 1:
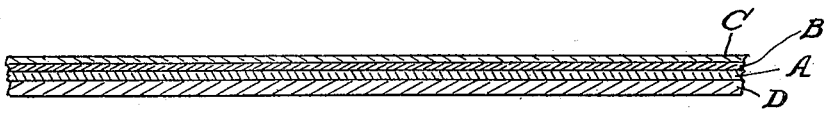
Figure 2:
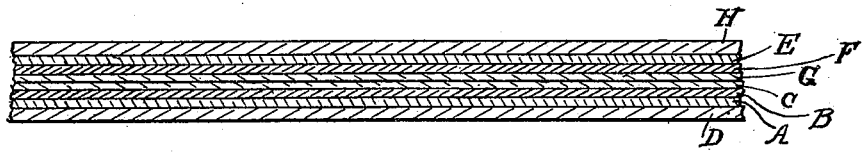

In the accompanying drawings, Figure 1 is a sectional view of a flexible film formed according to my invention. Fig. 2 shows two such films placed together for the purpose hereinafter set forth.

Referring to Fig. 1, the process is carried out as follows: The paper sheet D, which is to serve as a support, first receives a coating A of caoutchouc. Then this coating is covered with a layer B of collodion, and, finally, the gelatin layer C, which serves to hold the silver salt is applied. The light sensitive film is thus composed of the following three layers: first, the caoutchouc layer resting direct on the paper; second, a collodion layer intimately bound to the caoutchouc layer; third, an upper gelatin layer serving as carrier for the silver salt. In the drawing off of the complete films it is of the greatest importance that, contrary to the arrangements previously used, the caoutchouc layer should rest directly on the paper. In the first place after the negative film prepared by the above-described process is exposed, developed, fixed, and washed it presents after drying the advantageous peculiarity that it can be stripped with ease and certainty from the paper. The caoutchouc layer adheres to the paper fibers sufficiently to enable the different operations of developing, washing, &c., to be effected, but not sufficiently to present any considerable resistance to the stripping of the dry film from the paper. Thus a clean easy separation of the film from the paper is attained. A further advantage consists therein that the caoutchouc layer resting directly on the paper takes the grain thereof. By this means it is possible to give to this caoutchouc layer by selection of the proper paper a grain of any desired coarseness. This grain can be utilized to take the place of the retouching of the finished film, in whole or in part, in that the light-rays are dispersed and divided by the said grain. The minor irregularities of the negative are thus rendered ineffective by the dispersion of the light by the grain of the film without losing any of the characteristic features of the picture. These films with different grains thus offer a substitute for the tedious and troublesome work of retouching of the negative, and there are thus obtained with a little supplementary work, which in itself is materially facilitated by the grain, results that correspond to the technical requirements of photography, which were heretofore only attainable by very difficult and tedious work.

The negative film is somewhat thin and easily creased, which is objectionable in printing. To avoid this, the film is strengthened—that is, made thicker—as has hitherto been customary. For this purpose, however, there is used in this case a gelatin paper (see Fig. 2) which has similar layers E F G H to the layers of the light sensitive film, with the exception that the gelatin layer thereof contains no silver salt. This paper is wetted in water and pressed against the original negative while the latter is still on the paper, so that the two gelatin coatings adhere to one another. By rolls or other suitable means the two films are closely pressed together and the product thus obtained is hung up to dry. After the drying the two sheets of paper inclosing the negative can easily be stripped off, leaving a strong thick non-curling smooth sheet which can be copied from either side.

Substantial advantages of the method of reinforcement are, first, the ease and convenience of the operation for the operator, since the gelatin layers do not have to be carefully applied, with considerable loss of time; but the coated papers are simply squeezed together, and after drawing away the supporting-paper a film is always obtained of uniform thickness and quality; second, the film is completely protected from dust and other soiling substances by the superimposed paper sheets during the drying. Finally, as both gelatin layers are placed on the paper supports with identical intermediate layers the expansion in wetting and the contraction in drying are completely uniform, and the dried picture is thus completely even.

I claim—

A process for producing light sensitive films, consisting in applying to a sheet of paper, a layer of caoutchouc, then applying on the caoutchouc a layer of collodion, and finally on the collodion a layer of gelatin serving as a carrier for the silver salt, whereby the grain of the paper is imparted to the caoutchouc layer which adheres to the collodion and gelatin layers.

In testimony whereof I have hereunto set my hand in the presence of two witnesses.

OSWALD MOH.

Witnesses:
ERNEST L. GOLDSCHMIDT,
HENRY HASPER.